UNITED STATES PATENT OFFICE.

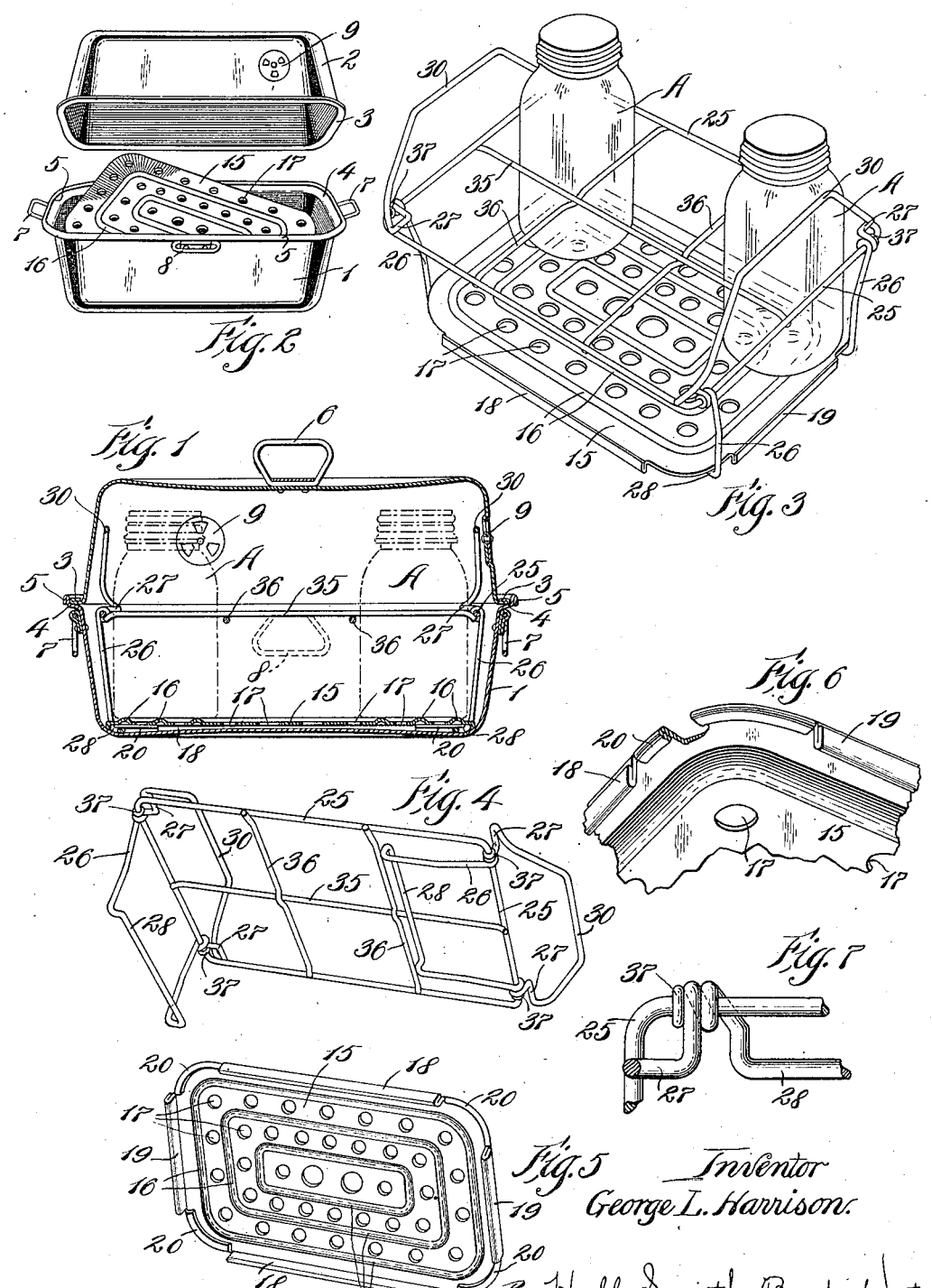

GEORGE L. HARRISON, OF CLEVELAND, OHIO, ASSIGNOR TO THE CLEVELAND METAL PRODUCTS COMPANY, OF CLEVELAND, OHIO, A CORPORATION OF OHIO.

CULINARY UTENSIL.

1,310,015.  Specification of Letters Patent.  Patented July 15, 1919.

Application filed June 30, 1916. Serial No. 106,781.

*To all whom it may concern:*

Be it known that I, GEORGE L. HARRISON, a citizen of the United States, residing at Cleveland, in the county of Cuyahoga and State of Ohio, have invented a certain new and useful Improvement in Culinary Utensils, of which the following is a full, clear, and exact description, reference being had to the accompanying drawings.

This invention relates to culinary utensils, particularly to what may be termed a combination culinary utensil, and it has for its objects the production of a strong and durable article of this nature having divers functions, and one that is extremely convenient of use.

Objects attained through novel structural details of the device will become apparent as the description proceeds; and while I have illustrated a desirable embodiment of my invention in the accompanying drawing, I wish to be understood as not limiting myself to the details thereof further than is required by the terms of the annexed claims and is rendered necessary by the state of the prior art.

In the drawing, Figure 1 is a central longitudinal section through the utensil of my invention; Fig. 2 is a perspective view of the utensil with the cover removed and showing the bottom plate partially removed from the pan; Fig. 3 is a perspective view of the rack and bottom plate assembled and supporting two preserving jars; Fig. 4 is a perspective view of the rack, one of the end or supporting members thereof being shown in operative condition, and the other folded as in condition for storage or shipment; Fig. 5 is an underneath perspective view of the bottom plate or false bottom; Fig. 6 is an enlarged detail, in perspective, of one corner of the bottom plate; and Fig. 7 is an enlarged sectional detail of one corner of the rack, the same constituting a horizontal section just above one of the pivotal connections between an end member and the frame.

As is common in the production of utensils of this nature, I provide a bottom plate or false bottom for the pan which, in the case of using the utensil as a roaster, serves to support the roast or other object a slight distance above the bottom of the pan and permits proper circulation of liquid beneath it.

In connection with this bottom plate or false bottom, I employ what I shall term a rack, which may comprise a frame that is supported a suitable distance above and connected to the bottom plate by supporting members that are attached to the ends of the frame and detachably connected to the ends of the bottom plate, such supporting members including handles which rise above the frame and afford convenient means of handling the rack.

This rack is extremely convenient in preserving by the modern steaming process as it is made to receive, in individual compartments, a suitable number of preserving or canning jars, and by means of the rack the jars may be easily placed into and removed from the pan without the danger of the user suffering from burned hands or without liability of the jars becoming broken or cracked by striking together, by reason of the above mentioned individual compartments.

This same rack may be used for sterilizing purposes, the objects to be sterilized being placed upon the rack and placed into and removed from the pan of the utensil in the same manner as the jars aforesaid.

Preferably, the end or supporting members of the rack are pivotally connected to the frame so that they may be folded into substantially the plane of the frame for storage or shipment purposes; and in the preferred arrangement, are held in operative position by means of the bottom plate.

The utensil comprises a pan 1, that is shown herein as rectangular in plan, and a correspondingly shaped cover 2, the lower edge of which is turned outward to produce a flange 3 which bears upon the outwardly flared portion 4 of the pan and reposes within the upwardly turned flange 5 which surrounds the portion 4. A handle 6 is applied to the top of the cover. To each end of the pan there is connected a handle 7 and a handle 8 is connected to one of the sides thereof. In order that the venting of the utensil may be conveniently attended to when the same occupies either a cross-wise or end-wise position in the oven, I provide shutter or damper controlled vent openings, represented generally at 9, in the side and also in the end of the cover.

15 represents the bottom plate or false bottom that is preferably formed of a single sheet of metal; is shaped to correspond to the shape of the bottom of the pan 1; is provided with ribs 16; and is freely perforated, as indicated at 17. Each side and each end of the plate has a downwardly extending flange 18 and 19, respectively, that is formed by turning the metal downward, then outwardly and upwardly against itself, as clearly illustrated in Fig. 6. The curved corner portions between the flanges 18 and 19 are strengthened by turning their respective edges directly inward and against the bottom of the plate, as indicated at 20.

The rack which is used in canning, sterilizing and like processes, comprises a frame 25, the same, in the present instance, being rectangular, and a supporting member 26 is attached to each end of the frame. I have shown the supporting members as pivotally connected to the frame, and this may be conveniently accomplished, since the frame and supporting members are preferably made of wire, by twisting the side portions of the members 26 about the end members of the frame, and above the plane of the frame, the side portions of the supporting members may be turned outwardly at 27 to engage the top of the frame, when the members are in operative or supporting condition, thus limiting the separation of the lower ends of the supporting members. The proportions should be such that when these supporting members are swung to operative position, the bottom plate 15 may be snugly received between them so that the parts are held in assembled condition slightly under tension and therefore secure against collapsing. The bottoms of the end members 26 are turned inward at 28 to repose along the underneath surface of the bottom plate inside the end flanges 19, the inwardly directed portions passing around the opposed ends of the flanges beneath the overturned corner portions 20. Above the frame 25 the supporting members 26 are formed to constitute handles 30 by which the rack may be conveniently handled. The frame 25 is divided centrally longitudinally by a rod 35, and transversely by rods 36, into individual compartments for the cans or jars represented in full line, in Fig. 3, and in dotted lines, in Fig. 1, and designated by the reference letter A.

To hold the end members 26 against lateral movement on the frame 25, I may employ collars 37. These collars may consist of rings of wire pressed about the end member of the frame and securely held in place by the tin plating wherewith I propose to coat the frame. The members 35 and 36 of the frame may be connected together and to the end and side portions of the frame by soldering or welding, or by any other suitable means.

Having thus described my invention, what I claim is:—

1. A device of the character set forth comprising a frame adapted to receive articles, a resilient supporting member depending from each end of the frame, and a removable bottom plate between the lower ends of said supporting members, the parts being so proportioned that the supporting members are under tension when the bottom plate is between them.

2. A device of the character set forth comprising a frame adapted to receive articles, a supporting member depending from each end of the frame, each supporting member comprising vertical portions and a horizontal portion connecting their lower ends, said supporting member being turned inward at its lower end, and a bottom plate between said supporting members and resting upon their horizontal portions, said plate having a peripheral depending flange that is interrupted at the corners to allow the horizontal portions of the supporting members to pass beneath the ends of the body portion of the plate.

3. A device of the character set forth comprising a frame that is adapted to receive articles, supporting members pivotally connected to opposed portions of the frame, means restricting said members against movement in one direction beyond operative position, and a bottom plate removably connected to said supporting members and serving to maintain them in operative position.

4. A device of the character set forth comprising a frame that is adapted to receive articles, supporting members pivotally connected to opposed portions of the frame and capable of swinging from a plane substantially parallel thereto into operative position, the frame and said members having coöperating portions which restrict the supporting members against movement beyond operative position, and a removable bottom plate between said supporting members and acting to hold said members in operative position.

In testimony whereof, I hereunto affix my signature in the presence of two witnesses.

GEORGE L. HARRISON.

Witnesses:
MAUDE MCFERRAN,
B. J. GREENOUGH.